United States Patent [19]

Rabinowitz et al.

[11] Patent Number: 4,594,630
[45] Date of Patent: Jun. 10, 1986

[54] EMISSION CONTROLLED CURRENT LIMITER FOR USE IN ELECTRIC POWER TRANSMISSION AND DISTRIBUTION

[75] Inventors: Mario Rabinowitz, Redwood City; Walter H. Esselman, Los Altos, both of Calif.

[73] Assignee: Electric Power Research Institute, Inc., Palo Alto, Calif.

[21] Appl. No.: 155,487

[22] Filed: Jun. 2, 1980

[51] Int. Cl.[4] ............................................. H02H 3/00
[52] U.S. Cl. ........................................ 361/13; 361/58; 361/93; 313/161; 313/310
[58] Field of Search ................... 361/58, 62, 3, 4, 8, 361/13, 14, 10, 11, 91; 313/217, 100, 96, 99, 161, 162, 93, 310, 349, 338

[56] References Cited

U.S. PATENT DOCUMENTS

| | | |
|---|---|---|
| 1,168,270 | 1/1916 | Arnold . |
| 1,328,495 | 1/1920 | Coolidge ........................ 361/58 X |
| 2,200,330 | 5/1940 | Engbert ........................ 313/349 X |
| 2,504,713 | 4/1950 | McArthur ...................... 313/100 X |
| 3,027,466 | 3/1962 | Roalef . |
| 3,047,746 | 7/1962 | Berkery ............................... 307/93 |
| 3,161,802 | 12/1964 | Jepsen et al. ................. 313/161 X |
| 3,238,395 | 3/1966 | Sense ............................ 313/310 X |
| 3,462,646 | 8/1969 | Bell .................................. 361/13 X |
| 3,474,293 | 10/1969 | Siwko et al. ......................... 361/13 |
| 3,529,210 | 9/1970 | Toshioito et al. ................... 361/58 |
| 3,875,440 | 4/1975 | McGee ............................... 313/96 |
| 3,909,676 | 9/1975 | McConnell . |
| 3,912,975 | 10/1975 | Knauer et al. ..................... 361/58 |
| 3,919,580 | 11/1975 | Mooney et al. ................... 313/310 |
| 3,958,131 | 5/1976 | Mozdzer . |
| 3,983,407 | 9/1976 | Shott . |
| 4,023,065 | 5/1977 | Koloc ........................... 313/161 X |
| 4,034,260 | 7/1977 | Lutz .............................. 313/161 X |
| 4,247,804 | 1/1981 | Harvey ......................... 313/161 X |

FOREIGN PATENT DOCUMENTS

| | | |
|---|---|---|
| 148150 | 12/1954 | Sweden . |
| 210743 | 3/1925 | United Kingdom . |
| 237538 | 7/1925 | United Kingdom . |
| 324766 | 2/1930 | United Kingdom . |
| 374913 | 6/1932 | United Kingdom . |

Primary Examiner—J. R. Scott
Assistant Examiner—T. DeBoer
Attorney, Agent, or Firm—Flehr, Hohbach, Test, Albritton & Herbert

[57] ABSTRACT

Method and apparatus are provided for an emission controlled current limiting device. The apparatus may control the current thermionically, by cold cathode emission, by photo-emission, or with plasma devices; the common feature being that the current is limited by controlling a series emission process. The apparatus has applications in both power line transmission and distribution networks to protect existing utility equipment and reduce the cost of new equipment.

10 Claims, 17 Drawing Figures

EMISSION CONTROLLED CURRENT LIMITER FOR USE IN ELECTRIC POWER TRANSMISSION AND DISTRIBUTION

BACKGROUND OF THE INVENTION

1. Field of the Invention

This invention relates generally to fault current limiters in power systems, and more particularly the invention relates to apparatus and methods for limiting fault currents in power line transmission and distribution networks by emission control.

2. Description of Prior Art

As electric power utility systems have grown in the past decade, the need has developed for a device to keep the potentially excessively high fault currents within the ratings of existing equipment such as transformers and circuit breakers. To date there is no known commercially available fault current limiter. Known devices have been either technically or economically unsuccessful.

Such devices have fallen into two broad categories. In the first category, a tuned circuit in which the inductive reactance essentially cancels the capacitance reactance is used in series in a power line to give a low impedance at the power frequency. When a fault (i.e. short circuit) occurs, a switch shorts out the capacitor, and the inductive reactance limits the current. Disadvantages include large size, big initial capital costs, and high operating costs.

In the second category, an impedance in parallel with a normally closed bypass switch is placed in series in the power line. When a fault is sensed, the bypass switch is opened and the current is transferred to the current limiting impedance. The approaches tried have included unstable vacuum arc controlled by a magnetic field or other high arcing voltage circuit breakers in parallel with resistors; switches in parallel with fuses in parallel with resistors; and driving superconductors into a highly resistive state. Some of the disadvantages are related to the difficulty in switching and the slow reaction because of the time required for sensing and switching operations.

Some solid state diodes have very low conductivity with rapid current saturation at very low voltage when operated in the reverse bias mode. Putting two such diodes in opposing back-to-back direction in series in a circuit would give current limitation for currents below 1A and less than 10V. However, they would not be practical for power applications requiring currents in kiloamperes and voltages in kilovolts.

OBJECTS AND SUMMARY OF THE INVENTION

General objects of the present invention include reduction in size and weight, increase in operating efficiency, lowered capital and operating costs, and increased operating reliability of current limitors in power applications.

A further object of the present invention is a fault current limiter for reducing overload current to zero thereby eliminating the necessity for circuit breakers, or, alternatively to bring the current to such a low level that the operational lifetime of circuit breakers is greatly extended.

Still another object of the invention is to provide the option of eliminating the sensing device and bypass switch whereby the current limiter is entirely autonomous in sensing and limiting the fault current as well as absorbing the energy during fault operation.

Yet another object of the invention is means for limiting fault current through use of the emission saturation limit of a thermionic emitter.

Still a further object of the invention is a thermionic current limiter which operates in the narrow region between reasonably limited Schottky emission during fault, and low voltage space charge limited current conduction during normal operation and at the inception of fault, with or without a grid.

Another object of the invention is a current limiter having grid controlled cold cathode emission for both current limitation and circuit breaking.

A still further object of this invention is a method and means for limiting the current by means of a photo-emitter.

A further object of this invention is a current limiter including a plasma device such as a low density Penning or McClure discharge to limit and reduce the current.

Additional objects and features of the invention will appear from the following description in which the various embodiments have been set forth in detail in conjunction with the accompanying drawings.

DESCRIPTION OF PREFERRED EMBODIMENTS

Overview

The present invention encompasses the method and apparatus for limiting an undesired over-current or fault current in an electrical power line by providing any of various emission controlled devices in the electrical circuit. The apparatus includes a cathode from which electrons emanate and which at a predetermined current level becomes emission limited, thus yielding a saturation current between the cathode and anode independent of the voltage across the device.

Figure 2A:
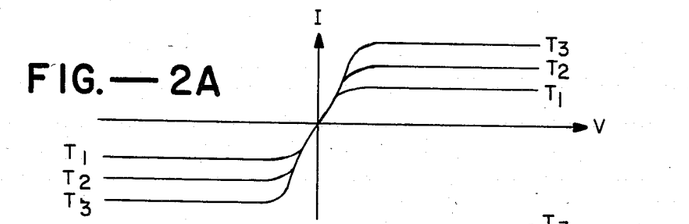
FIG. 2A depicts the current- voltage characteristic of two back-to-back thermionic fault current limiters for three temperatures.
Figure 2B:
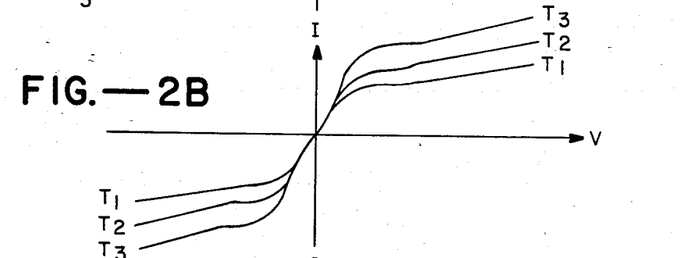
FIG. 2B is the current-voltage characteristic of a bi-directional thermionic device operating in the Schottky emission region.
Figure 2C:
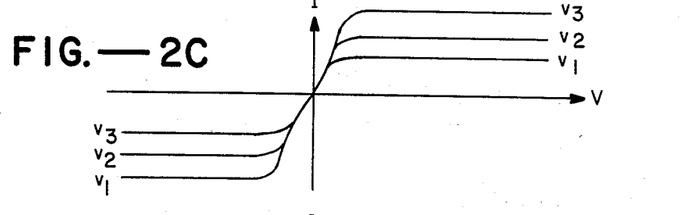
FIG. 2C illustrates the current voltage characteristic for a grid controlled field emission or thermionic emission fault current limiter.
Figure 2D:
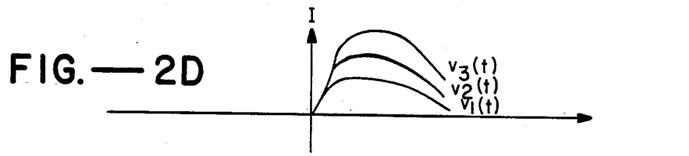
FIG. 2D illustrates the current voltage characteristic for a grid controlled fault current limiter where the grid voltage is reduced as a function of time.

In a thermionic emitter, it is the temperature of the cathode which determines the saturation or emission limit of the current as shown in FIG. 2A. Even though as the voltage increases, the electrons go at a higher velocity as they traverse the gap, the current does not increase. This is because as electron speed increases, the volume number density of the electrons decreases in the gap, thus keeping the current constant. This phenomenon is utilized to limit a fault current in accordance with one embodiment of the invention. FIG. 2B is similar to FIG. 2A but includes Schottky emission, as will be discussed further hereinbelow. In a field emitter, a grid between the cathode and anode determines the saturation limit of the emission current as shown in FIG. 2C. This is also the case when a grid is placed between the cathode and anode in a thermionic emitter operating in the space charge limited mode. In either case, the grid allows the current to be reduced all the way to zero if desired, simply by reducing the grid voltage as shown in FIG. 2D.

CONSTRUCTION AND OPERATION OF THE EMBODIMENTS OF FIGS. 1, 3, 4, 5, 6, 8, 10, and 11.

Thermionic Emission

Figure 1:
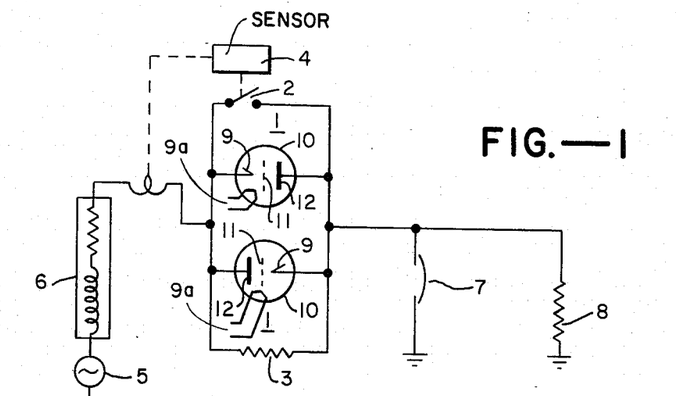
FIG. 1 is a schematic of one embodiment of a current limiter in accordance with the invention including two unidirectional fault current limiters in parallel back-to-back operation with by-pass switch and energy absorbing resistor in one phase of a power line.

Referring now to FIG. 1, a thermionic emission device in accordance with the invention includes two unidirectional fault current limiters 1 in parallel back-to-back operation with a by-pass switch 2, and an energy absorbing resistor 3. A sensor 4 opens the by-pass switch 2 when a fault is sensed. One phase of a power line is shown, with a generator 5 and source impedance 6. A potential fault 7 is in parallel with the normal load 8. The tube 10 can be considered as a thermionic device or as a cold cathode field emission device. The tube 10 will first be considered in thermionic operation.

The cathode 9 of low work function material is in a fault current limiting tube 10 which also contains a heater 9a a grid 11 an anode 12. To reduce power loss during normal operation, it is important to choose the material of the cathode 9 carefully. In steady state thermionic emission the power input to the cathode emitter equals the power loss from the cathode to which the following are the main contributors:

1. The process of thermionic electron emission cools the cathode just as the process of evaporation cools the source of the evaporating atoms or molecules. The energy taken by an electron in leaving the cathode is $\phi + 2kT_c$, where $\phi$ is the work function of the cathode, k is the Boltzmann constant, and $T_c$ is the absolute temperature of the cathode. Therefore, the power lost by the emitter due to this process is $I/e \, (\phi + 2kT_c)$ where I is the emission current e is the electronic charge.

2. The radiation from the cathode is proportional to $T_c^4$. The net radiation depends on the temperature of the bodies surrounding the cathode. If, for example, the cathode is completely surrounded by a coaxial cylindrical anode, then the net radiation power loss is $ac \, k(T_c - T_a)$.

3. Power is conducted away from the cathode through its electrical leads which is related to $T_c - T_b$, where $T_b$ is the temperature of the base.

4. In the case of a low pressure gas-filled tube, there is a small loss due to conduction and convection of heat in the gas.

When the tube 10 is highly evacuated, the ratio of voltage drop without breakdown during fault to the voltage drop during normal operation is much higher than if the tube is gas filled. On the other hand, it the tube has a low ionization potential gas or vapor, such as cesium, sodium and/or potassium, there is a lower voltage drop across the tube 10 during normal conduction due to space charge neutralization and other effects which will be discussed hereinbelow.

The relative merits of the two modes of operation, vacuum versus low pressure gas, relate to the economics of whether or not the sensor 4 and the by-pass switch 2 are to be included. They are not essential as the fault current limiting tubes 10 are capable of autonomous operation without them. The question relates to the economic tradeoff between the capital cost of the sensor and by-pass switch versus the higher operating cost due to larger power loss of the tubes operating without the sensor and switch.

During normal operation, the by-pass switch 2 is in the closed position and shunts the tubes 10. The purpose of the switch 2 is to provide a low impedance path for the normal current to minimize power losses during normal operation. When a fault current is sensed by the sensor 4, the switch 2 opens, and the current transfers to the fault current limiting tubes 10. If the tubes 10 have sufficient thermal capacity, the energy absorbing resistor 3 may not be necessary. The purpose of the resistor 3 is to help absorb the large amount of energy which is dissipated during a fault.

To further minimize power losses during normal operation, it is important to operate the cathode 9 at as low a temperature as possible. This implies the necessity of a low work function cathode. Cathodes made of tungsten suffer from the drawback that tungsten has a relatively high work function of 4.5 eV. Thoriated tungsten containing thorium on the tungsten reduces the work function to 2.6 eV. Cathodes made of a metal base of nickel, konel, or platinum alloys, coated with a layer of rare-earth oxides such as barium and strontium yield a cathode work function of about 1 to 2 eV. Since these oxides are unstable in air, the cathode is first coated with barium or strontium carbonates or nitrates by spraying or dipping, followed by a drying process. During evacuation, the cathode is activated by heating above the normal operating temperature, and the coatings are reduced to the oxide with released gases being removed by vacuum pumps.

For use with vapors such as cesium, cathodes made of lanthanum hexaboride $LaB_6$ are desirable. The small concentration of cesium required for a low lanthanum-hexaboride work function also lessens losses related to thermal conduction, electric resistance, and collisional-deionization in the plasma when the gas or vapor mode is chosen. $LaB_6$ has a melting point of 2800° K., and with slight cesiation, the work function has been reported to be as low as 0.8 eV. The hexaborides of samarium and europium show similar behavior. Other metallic borides, carbides and silicides could be used. Titanium diboride ($TiB_2$) for example melts at 3,250° K. The uncesiated work functions vary from 2.1 to 6.6 eV for borides, 2.0 to 4.9 eV for carbides, and 2.5 to 4.3 eV for silicides. Adsorbed cesium on these surfaces significantly reduces the work function.

A low work function cathode can result in a greatly reduced operating temperature for the cathode, as evidenced from the Richardson-Dushman (R-D) equation, which is the fundamental equation governing thermionic emission, as follows:

$$J = A_o(1-r)T^2 \exp[-\phi/kt],$$

where
- $J$ is emitted current density in $A/cm^2$.
- $A_o$ is universal constant, 120.4 $A/cm^2\text{-}K^2$
- $r$ is reflection coefficient.
- Since the work function, $\phi$, occurs in the exponent, the thermionically emitted current can be greatly increased by a small reduction in $\phi$.

The R-D equation gives the saturation or limiting current which may be carried in a thermionic tube when the electric field at the cathode does not become great enough to substantially lower the potential barrier. This occurs in tubes with large spacing between the cathode and anode, and the current-voltage characteristic is shown in FIG. 2A for a pair of such tubes in back-to-back parallel operation as illustrated in FIG. 1. As shown in FIG. 2A, current saturation (without the use of, or in the absence of, the grid 11) is determined by the successively higher temperatures $T_1$, $T_2$, and $T_3$ at the cathode. Current saturation or limitation is that condition when the current through the tube 10 is independent of the voltage, V, between the cathode 9 and anode 12.

As shown in FIG. 2A the first rapid rise portion of the current is space charge limited and goes as $V^{3/2}$ in the absence of tailoring which is discussed further hereinbelow. The second portion of the current is almost constant and essentially independent of V. This second portion is related to the rate of thermionic emission which is temperature limited. The space charge limited portion is governed by the Langmuir-Child (L-C) law which is $$J(A/cm^2) = 2.33 \times 10^{-6} V^{3/2}/d^2,$$

for a uniform field between a plan cathode and anode of gap d (cm) and voltage V (volts). For a diode with long concentric cylinders $$J(A/cm) = 14.6 \times 10^{-6} V^{3/2}/Br_a$$

Where $r_a$ is the anode radius in cm, and B is a number which approaches zero as the ratio of anode radius to cathode radius, $r_c$, approaches 1, and as $r_a/r_c$ gets large, B goes from 1.1 to 1. It should be noted that the R-D equation sets an upper limit on the number of electrons that can be emitted from a given cathode at temperature T, and that the L-C equation determines the net number of electrons which reach the anode. The current can never be greater than the emission value, but it may be less due to space charge limitations.

The implication of the $V^{3/2}$ factor in the L-C equation is that in order to keep the minimum voltage, $V_{min}$, low for reaching saturation current, the gap spacing between the cathode and anode must be small. As the voltage goes up across a small gap the electric field eventually gets high enough to lower the potential barrier leading to Schottky emission, as shown in FIG. 2B. The Schottky (S) equation is $$J = A_o(1-r)T^2 \exp[-\{\phi - e(eE)^{\frac{1}{2}}\}/kT]$$

where e is the electronic charge and E is the electric field at the cathode.

The S equation is essentially a modified R-D equation to include the effects of the electric field. Schottky emission prevents saturation current from occurring, as illustrated by FIG. 2B. To avoid or minimize Schottky emission without using a grid requires a large gap which is the opposite requirement of the L-C equation. In this situation, the range of acceptable operating parameters is limited. However, a narrow operating range which satisfies both requirements can be found by keeping $J_{L-C} \leq J_S$ up to the minimum voltage, for nominal current saturation and not allowing $J_s$ to increase by more than a factor of 2 or 3 beyond nominal current saturation as V goes from $V_{min}$ to $V_{max}$ as determined by the power line.

Figure 3:
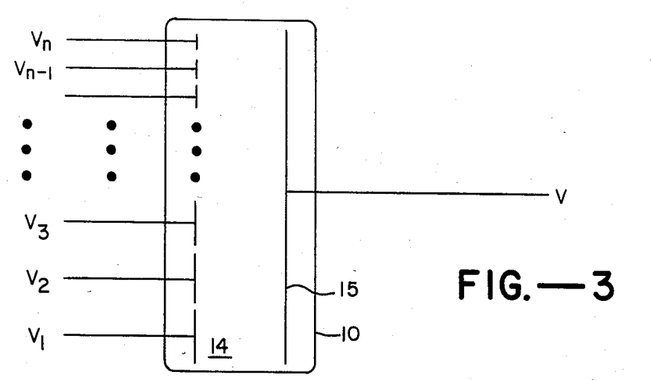
FIG. 3 illustrates a segmented cathode with vertical gradient to tailor a high rise of current with voltage in a fault current limiter in accordance with another embodiment of the invention.

It is possible to have a virtual violation of the L-C law, in accordance with one aspect of the invention. This introduces greater flexibility and widens the range of operating parameters. For example, if the cathode is segmented and a voltage is maintained across the length of the segmented cathode 14 as shown in FIG. 3, it is possible to tailor the functional dependence of current with voltage so that the current rises faster (higher exponent) than the 3/2 exponent that the L-C law allows. Voltages $V_1$, $V_2$, $V_3$ and $V_{n-1}$, $V_n$ are each maintained on the corresponding segments of the cathode 14 as shown. As the voltage V on the anode 15 is increased, the emitted electrons from more and more of the segments will progressively be collected, rapidly increasing the total current.

Figure 4A:
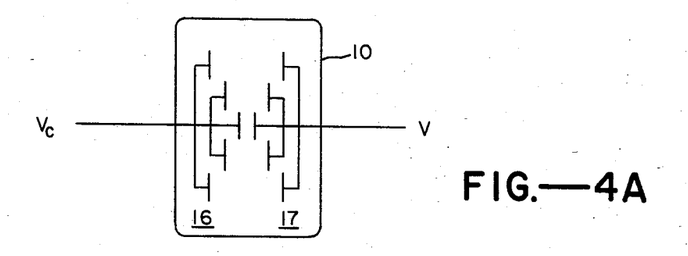
FIG. 4A is a fault current limiter having segmented electrodes with varying spacing to tailor a low rise of current with increasing voltage.

It is also possible to tailor the functional dependence of current with voltage so that the current rises slower than the 3/2 exponent which the L-C law allows. As shown in FIG. 4A, the cathode 16 as well as the anode 17 are segmented. Because the current goes inversely as $d^2$ (L-C law), the closer electrodes will reach current saturation first, followed progressively by the others. Similarly, the electric field is less at the more distant electrodes, minimizing Schottky emission. The total current will thus rise more slowly than otherwise.

Figure 4B:
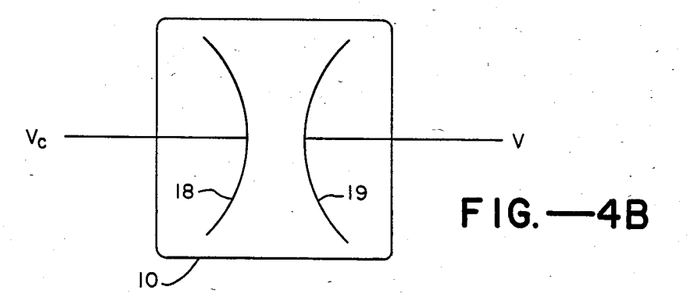
FIG. 4B is a fault current limiter in accordance with the invention and having variably spaced continuous electrodes.
Figure 4C:
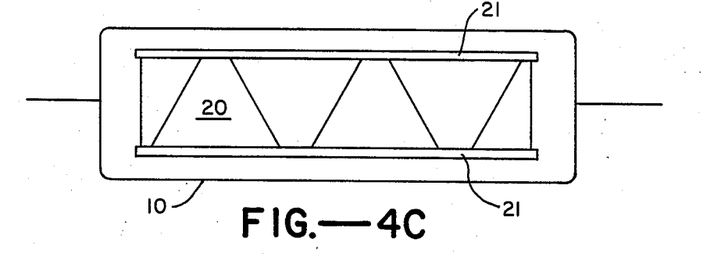
FIG. 4C is a fault current limiter in accordance with the invention and including a bi-directional emission controlled series of diodes with variable spacing.

FIG. 4B illustrates the same concept, but with continuous electrode 18 and continuous electrode 19 so that the gap varies in a predetermined fashion to limit the current rise. By heating both electrodes such as by maintaining a sufficiently high temperature of the tube 10, either electrode 18 or 19 may be the emission cathode. Thus the tube 10 need not be unidirectional, but may be bidirectional. This eliminates the need for tubes 10 in back-to-back parallel arrangement as shown in FIG. 1, and a single tube 10 can suffice. FIG. 4C illustrates such a bi-directional tube in which the electrodes 20 are in series and insulated and isolated by the dielectric envelope 21.

Figures 5, 6:
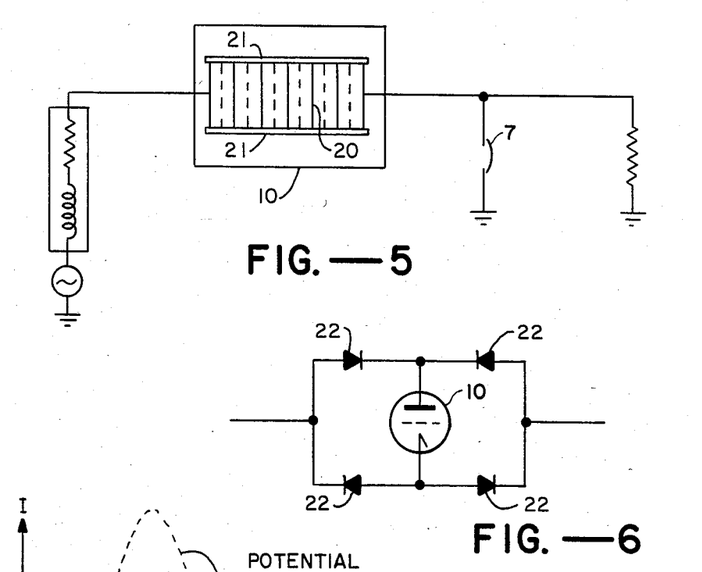
FIG. 5 is a schematic showing a bi-directional fault current limiter without by-pass switch or absorbing resistor in one phase of a power line.
FIG. 6 is a circuit for making a unidirectional fault current limiter bidirectional.

FIG. 5 depicts the bi-directional fault current limiting tube 10 in a similar power line circuit as described in connection with FIG. 1, wherein 7 is the potential fault. In this case the normal operating losses are small enough that no by-pass switch is needed. Also there is sufficient thermal capacity in the electrodes 20 and the dielectric envelope 21 so that the energy absorbing resistor is also eliminated. Since the current does not have to transfer from a by-pass switch to the tube, a rapid rise of current in the tube as a function of voltage, is not needed. Instead a rise that is slower than $V^{3/2}$ is desirable for currents above normal current in a tube that operates in the circuit without a by-pass switch.

Besides heating both electrodes so that the fault current limiting tube 10 is bi-directional, it is possible to eliminate one of the pair of uni-directional tubes 10 and still handle ac currents. This is shown in FIG. 6. By adding the four solid state diodes 22 as shown, ac can be handled by one uni-directional tube 10.

Figures 7, 8:
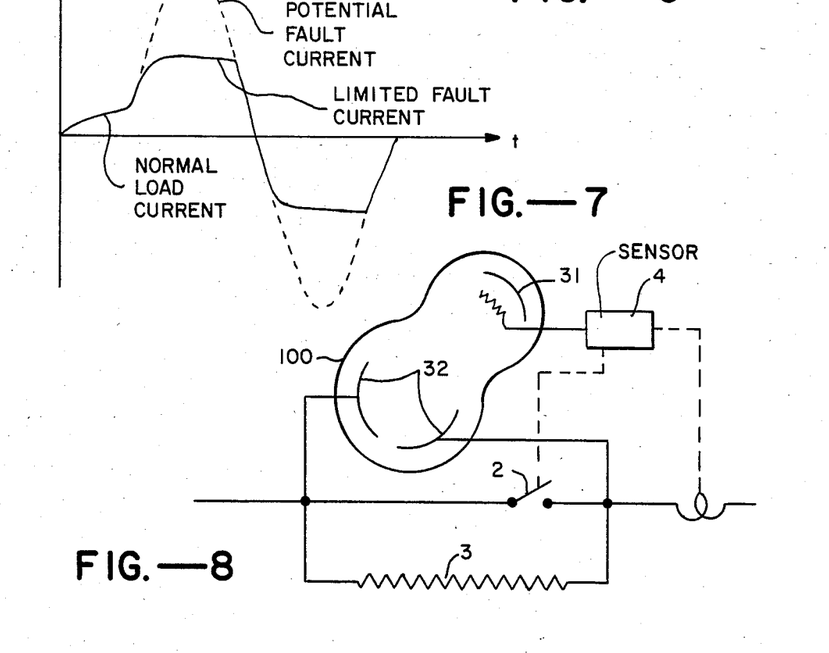
FIG. 7 illustrates current waveform during a fault when using a current limiter in accordance with the invention.
FIG. 8 illustrates another embodiment of the invention including a photo-emitter and circuit for limiting a fault current.

FIG. 7 illustrates the normal load current and available fault current as a function of time. The fault current as limited by this invention is also shown.

Grid

Consider now the role of a grid in the fault current limiting device. Referring back to FIG. 1, a grid 11 is shown inside the fault current limiting tube 10. So far the fault current limiter has been operated without the grid. However, in the case of thermionic emission in high vacuum or with a low pressure gas, a grid 11 near the cathode 9 permits an arbitrary low level of saturation current to be reached at a relatively low voltage, v. As the voltage V continues to increase, the current reaching the anode 12 will be limited or controlled by the voltage v on the grid. This is illustrated in FIG. 2C which shows the current-voltage characteristic for a grid controlled fault current limiter for successively higher voltages $v_1$, $v_2$, $v_3$. Basically, the grid 11 shields the cathode 9 from the field produced by the anode 12. Thus the problem of Schottky emission is avoided. Also, a saturation current going to the anode may be picked which is less than the emission saturation level of the emitter. In fact, as shown in FIG. 2D, the current may be reduced to an arbitrarily low level by reducing the voltage v(t) on the grid 11. Thus, with the grid the fault current limiter can even be a switch or circuit breaker. The grid 11 needs to be transparent enough to minimize the current it collects and yet effectively shield the cathode 9 from the field produced by the anode 12.

Field Emission

Consider now a field emission cathode in the fault current limiter. The application of a high electric field (e.g. $10^7$ V/cm) to a cathode greatly reduces the width of the potential barrier. Field emission consists of the tunnelling of electrons through the thinned potential barrier at the cathode surface, in contrast with thermionic or Schottky emission in which the electrons go over the potential barrier. Field emission is basically governed by the Fowler-Nordheim equation $$J(A/cm^2) = 6.2 \times 10^{-6} \frac{(F/\phi)^{\frac{1}{2}}}{(F+\phi)} E^2 \exp\left(-6.8 \times 10^7 \frac{\phi^{3/2}}{E}\right).$$

(As written here, it is uncorrected for image potential.) F˚ is the Fermi energy in electron volts and E is the electric field at the cathode in V/cm. The emission current density, J, continues to increase as E increases.

Therefore, a grid 11 is needed between the cathode 9 and anode 12, as shown in FIG. 1, to limit or control the current by controlling the electric field at the cathode 9. The grid 11 needs to be transparent enough so that it collects very little current. As shown in FIG. 2C, various grid voltages $v_3 > v_2 > v_1$ positive with respect to the cathode potential will result in a constant current if they are held constant beyond a minimum value. If it is desired to reduce or switch off the current as shown in FIG. 2D, the grid voltage v(t) may be reduced as a function of time.

A unidirectional field emission tube 10 as shown in FIG. 1 can be made to function bidirectionally in either of two ways. As shown in FIG. 6, it may retain its intrinsic unidirectionality, and yet function bidirectionally by the addition of the diodes 22. Alternatively, the cathode and anode may exchange roles every half cycle and just be considered electrodes 20 in a fault current limiting tube 10 as shown in FIG. 5. This may be accomplished by making both electrodes of low work function material with local electric field enhancement such as a brush electrode (an array of needles). Variations of the straightforward field emission process may be used such as thermionic field emission, oxide films on the cathode positive ions to produce intense electric fields, Malter effect cathodes, patch field cathodes, and the like. For example, a tunnel diode uses thin films of aluminum, Al, and gold, Au, separated by a thin film of aluminum oxide. When positive voltage on the Au is applied across the junction, electrons tunnel from the Al through the oxide barrier to the Au. As the voltage is increased, some of the electrons receive sufficient energy to penetrate the gold film and are emitted into the free space and accelerated to the anode. The gold film here plays the role of the grid as previously described.

Photoelectric Effect

Consider now a fault current limiter utilizing a photoelectric effect tube 100 as shown in FIG. 8 in operation with a bypass switch 2, and an energy absorbing resistor 3. A sensor 4 opens the bypass switch 2 when a fault is sensed. The switch 2 is in the closed position during normal operation. Simultaneously, the sensor fires a light source 30, which may be either electrical or chemical A parabolic-like mirror 31 helps to focus the light on the low work function, $\phi$, electrodes 32. Depending on the polarity, one electrode 32 acts as the cathode and the other electrode 32 acts as the anode. Thus the tube 100 is bi-directional. The main spectral frequencies, f, of the light are such that $hf \geq \phi$ where h is Planck's constant.

The current in the tube 100 rises rapidly so that the arc in the switch 2 may be quickly extinguished and transferred to the tube 100. The current in the tube 100 is maintained as long as the light pulse continues. When the light goes off the current in the tube 100 ceases, and transfers to the resistor 3. The resistor 3 limits the current and absorbs the dissipated power.

The photoelectric tube 100 may be either evacuated or gas-filled. If it is evacuated, the current is purely due to photo-electrons. The rise of the photo-electron current is space charge limited as previously discussed, and the saturation current is determined by the intensity of the light. If the tube 100 is gas filled, the current is a function of both the emitted photo-electrons and the electron-ion pairs formed by ionization in the gas.

LOW PRESSURE GAS DISCHARGE

Figure 9:
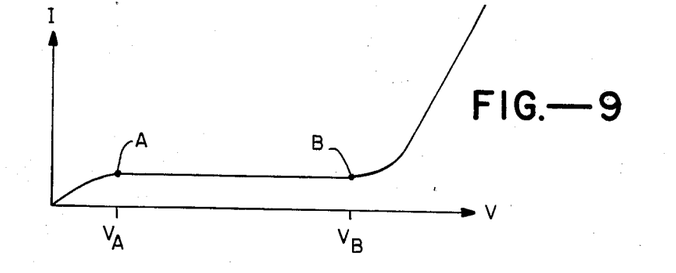
FIG. 9 is a plot of current versus voltage for the unignited discharge mode.

FIG. 9 is a plot of current versus voltage for any of the previously described devices operating in the gas discharge mode. If the voltage is increased across a pair of plane parallel electrodes in a tube containing a low pressure gas, the current will first rise rapidly to point A in the current-voltage curve of FIG. 9 at voltage $V_A$. As the voltage continues to increase from $V_A$ to $V_B$ the current remains approximately constant from A to B. For fault current limiting applications it is desirable to have $V_A$ small and $V_B$ large, with a high ratio of $V_B/V_A$. This can be achieved with a proper choice of parameters such as a low ionization potential gas with large ionization cross section, pressure, temperature, etc. A number of, n, such electrodes can be placed in series so that a total voltage $V<(n-1)V_B$ can be impressed across the series of gaps without exceeding $V_B$ for any one gap, as shown by the tube 10 in FIG. 5 with electrodes 20. The rest of the current-voltage curve is thus avoided.

If, in a low pressure discharge of $\lesssim 10$ Torr, a source of ionizing electrons (such as by thermionic emission, field emission, photo-emission, or the like) is incorporated in the cathode so that the rate of ionization is constant, then a greater constant current will be maintained over the wide voltage range $V_A$ to $V_B$. This is because the free electrons and free ions are collected at the same rate as they are formed without avalanche. For any appreciable current, this region of the discharge depends upon the supplementary ionization source and is referred to as the unignited mode.

A gas or vapor using the alkali metals such as cesium, rubidium, potassium, sodium, and lithium (at elevated temperature) has the advantage of low ionization potential and high vapor pressure at moderate temperature. The ease of ionization and high degree of ionization can be obtained with these alkali metal vapors makes them attractive for such an application and gives a large voltage range $V_A$ to $V_B$ of nearly constant (limited) current. However, they are undesirable with respect to their corrosive characteristics. Gases for which corrosion is not a problem, can be used by going to large electrode areas and more electrode pairs with a smaller voltage range for each electrode pair.

At very low pressures ($\lesssim 10^{-1}$ Torr) where the current is predominantly due to the emitted electrons from the cathode, the presence of a small number of positive ions near the cathode can have a beneficial effect. Due to its smaller velocity, one ion can effectively neutralize many electrons in approximate proportion to $[M_i/M_e]^{\frac{1}{2}}$ where $M_i$ is the ion mass and $M_e$ is the electron mass. Thus, the space charge limitation of current rise can be overcome giving, where desired, a much more rapid rise of current increase with voltage to the saturation level.

In a bidirectional field emission fault current limiter using an array of needles at both electrodes, a certain amount of field ionization of the gas will occur at the anode, as well as impact ionization near the cathode to supply ions for space charge neutralization.

In a thermionic emission fault current limiter, in addition to impact ionization of the gas near the cathode, it is possible to have surface ionization as a source of electrons and ions. Surface ionization can easily be understood in terms of the relative ionization potentials of the gas and of the work function of the surface that the gas impinges upon. If the ionization potential of the gas is less than the work function of the surface, the gas atom donates a valence electron to the high work function surface and becomes an ion.

However, surface ionization works not only as described above, but occasionally in unexpected circumstances. For example, the surface ionization of potassium, K, and sodium, Na, shows surprisingly close thermodynamic behaviour from two widely varying materials. Rhenium has a work function of 4.9 eV (one of the highest metal work functions) and lanthanum hexaboride, $LaB_6$, has a work function of 2.6 eV. Yet Na and K with first ionization potentials of 5.1 and 4.3 eV, respectively, had essentially the same surface ionization characteristics from these two surfaces. It may be that $LaB_6$ has microscopic regions of both very low and very high work function.

$LaB_6$ is both an excellent thermionic electron emitter because of its low work function and s an efficient surface ionizer. It also retains absorbed cesium which lowers its work function to 0.8 eV.

Where alkali metal vapor corrosion is a problem, the alkali metal may be impregnated in the bulk of the electrode material with a controlled elevated temperature diffusion to the surface. Even a concentration of only 1 part in $10^3$ of the bulk of the electrode gives a density of approximately $10^{20}$ alkali metal atoms/cm$^3$. When compared with the vapor density of $10^{13}$ atoms/cm$^3$ at $10^{-3}$ torr, it is clear that an electrode diffusion source of alkali atoms would not be quickly depleted. Such a source could be available for maintaining a low surface work function, and if desired as a source of ions to neutralize the electron space charge.

Figure 10:
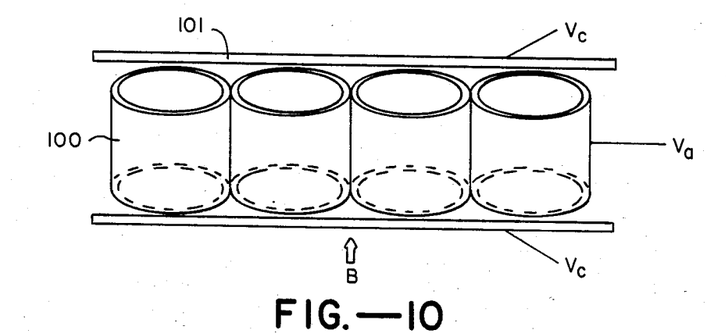
FIG. 10 is a Penning discharge array of cylindrical anodes between cathode plates and parallel magnetic field.

At extra low pressures, $\lesssim 10^{-4}$ torr, the gas discharge may be maintained by applying a magnetic field in a direction parallel to an array of cylindrical anodes 100 between two cathode plates 101 as shown in FIG. 10. The cathodes may be either in the thermionic or field emitting modes. Controlling the magnetic field and/or controlling the emission from the cathodes can effectively control the current. Such a discharge is called a Penning discharge.

Figure 11A:
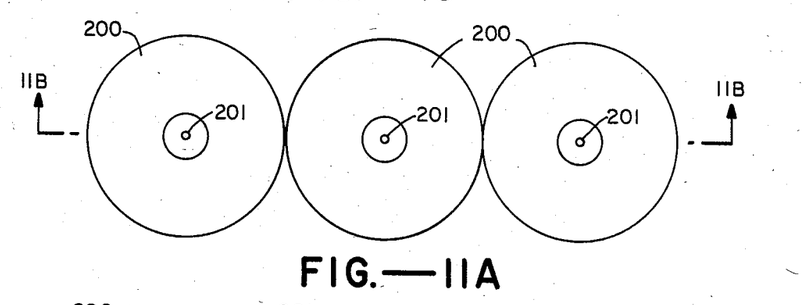
FIG. 11a is a top view of one McClure cell.
Figure 11B:
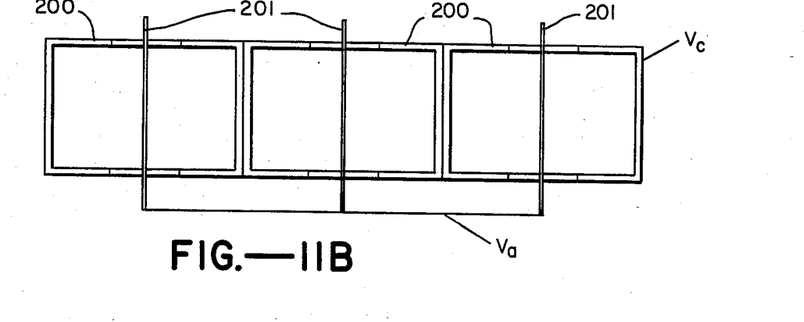
FIG. 11b is a cross-sectional view of an array of McClure cells.

Another method of controlling current with extra low pressure discharge that avoids the necessity of a magnetic field is by using an array of McClure cells as shown in FIG. 11B. FIG. 11A shows a top view of one McClure cell. FIG. 11B is a cross-sectional view through A-A of each cell, showing the cylindrical cathodes 200 coaxial with the central anodes 201.

In both the Penning and McClure cells, the electrons have a long mean free path before they are collected by the anode, and have a high probability of ionizing the very low pressure gas. In the case of the Penning cells, the combination of electric and magnetic fields produces the long mean free path. In the case of the McClure cells, it is a matter of conservation of angular momentum of the electrons giving them a long mean free path before they are captured by each central anode. Thus electron trapping can be achieved by a purely electrostatic field. Both the Penning and McClure discharges may be maintained at extremely low pressures, well below $10^{-6}$ torr. For pressures below $10^{-4}$ torr, the discharges are maintained primarily to neutralize the electron space charge. The cathodes may be either thermionic emitters or controlled field emitters as previously described. Large current capacity is obtained by connecting cells in parallel, and high voltage capability by connecting them in series.

There has been described the method of limiting an electrical fault current in an electrical power line by controlling current emission. The apparatus for carrying out the invention has been described with reference to several embodiments. However, the description is illustrative of the invention and is not to be construed as limiting the invention. Various adaptions, applications, and modifications may occur to those skilled in the art without departing from the true spirit and scope of the invention as defined by the appended claims.

What is claimed is:

1. For use in limiting fault currents in electrical power transmission and distribution lines, a fault current limiting circuit comprising a first emission limited device having a cathode element, an anode element, and means for effecting the emission of current carriers from said cathode whereby current carrier emission is limited above the current level established by said means for effecting the emission; a second emission limited device having a cathode element, an anode element, and means for effecting the emission of current carriers from said cathode whereby current carrier emission is limited above the current level established by said means for effecting the emission; and means connecting said first emission limited device and said second emission limited device in parallel and in opposite polarity.

2. A fault current limiting circuit as defined by claim 1 and further including low impedance switch means, means connecting said switch means in parallel with said first and second current limited device, and means responsive to a current in said electrical power line for maintaining said switch means closed in response to normal operating current levels, and for opening said switch means in response to a fault current.

3. A fault current limiting circuit as defined by claim 2 wherein said means for limiting current comprises means for heating said cathode whereby current carrier emission is limited thermionically.

4. A fault current limiting circuit as defined by claim 3 wherein said cathode comprises a surface layer of material which ionizes at a rate that is determined by the volume and surface area of the material and electron emission rate.

5. A fault current limiting circuit as defined by claim 3 wherein said cathode is cylindrical and said anode is cylindrical and coaxial with said cathode.

6. For use in limiting fault currents in electrical power transmission and distribution lines, an emission limited device comprising a cathode element, an anode element, and means for effecting the emission of current carriers from said cathode whereby current carrier emission is limited above the current level established by said means for effecting the emission, said cathode comprising a surface layer of material which ionizes at a rate that decreases above a level determined by the volume and surface area of said material, and said anode and said cathode are separated by a varying gap distance.

7. An emission limited device as defined by claim 6 wherein said means for effecting emission of current carriers includes a grid electrode.

8. An emission limited device as defined by claim 6 wherein at least one element is segmented.

9. For use in limiting fault currents in electrical power transmission and distribution lines, an emission limited device comprising a cathode element, an anode element, and means for effecting the emission of current carriers from said cathode whereby current carrier emission is limited above the current level established by said means for effecting the emission, said cathode comprising a surface layer of material which ionizes at a rate that decreases above a level determined by the volume and surface area of said material, and at least one element is segmented.

10. An emission limited device as defined by claim 9 wherein said means for effecting emission of current carriers includes a grid electrode.

* * * * *